United States Patent [19]
Gigoux

[11] 3,859,177
[45] Jan. 7, 1975

[54] METHOD OF MANUFACTURING MULTILAYER CIRCUITS

[75] Inventor: Claude Gigoux, Paris, France

[73] Assignee: Thompson-CSF, Paris, France

[22] Filed: Sept. 19, 1972

[21] Appl. No.: 290,357

[30] Foreign Application Priority Data
Oct. 15, 1971 France .................. 71.37163

[52] U.S. Cl. ............................... 204/15, 29/625
[51] Int. Cl. .................................... C23b 5/48
[58] Field of Search ............ 204/15, 16, 9; 29/625

[56] References Cited
UNITED STATES PATENTS

| | | | |
|---|---|---|---|
| 3,566,461 | 3/1971 | Carbonel | 340/174 |
| 3,583,066 | 6/1971 | Carbonel | 174/68.5 |
| 3,611,558 | 10/1971 | Carbonel | 29/604 |
| 3,650,908 | 3/1972 | Carbonel | 204/11 |
| 3,721,612 | 3/1973 | Gigoux et al. | 204/15 |

Primary Examiner—T. M. Tufariello
Attorney, Agent, or Firm—Cushman, Darby & Cushman

[57] ABSTRACT

A novel method of manufacturing "printed circuits" arrangements, with one or several layers of conductors, is provided.

By successive operations of photogravure and metal deposition using electrolysis, there is constructed, without any mechanical procedure, a structure comprising a temporary skeleton and conductors arranged at different layers and interconnected by conductive eyelets. The metal constituting the temporary structure is selectively attacked and replaced by resin to constitute a new insulating structure.

5 Claims, 21 Drawing Figures

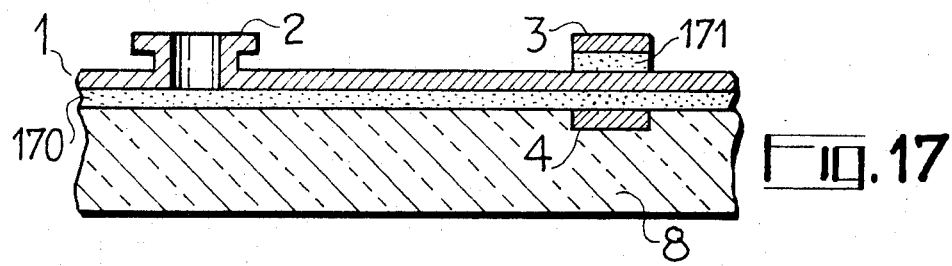
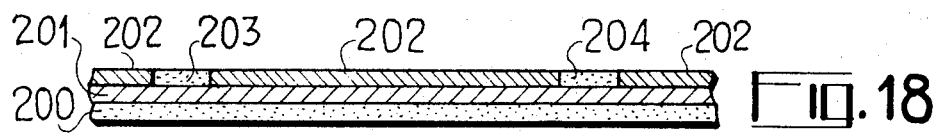
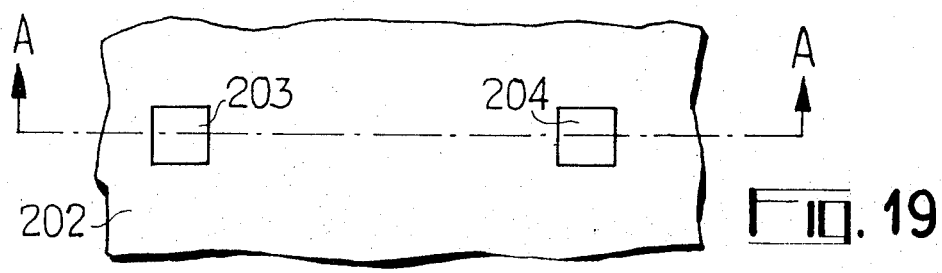
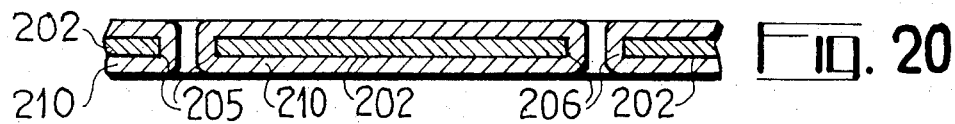
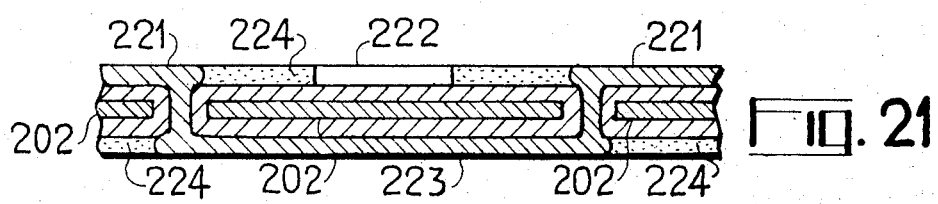

METHOD OF MANUFACTURING MULTILAYER CIRCUITS

The present invention relates to a novel method of manufacturing "printed circuits" which presents one or more layers of conductors, certain of which are connected to one another at the points of interception.

The development of wiring arrangements has given rise to the design of printed circuits with one or subsequently several layers. Circuits of this kind are manufactured by mass-production techniques, using equipment, which in addition to physico-chemical operations, carries out numerous mechanical operations, such as drilling, pressing and the application of materials by machines similar to those used in printing. The apparatus, since it is expensive, has to be designed for large outputs in order to enable the cost to be amortised within an acceptable period of time. Equipment of this kind are ill-suited to the manufacture of small, high-accuracy wiring arrangments, in situations where low cost and small production runs are needed.

The invention provides a method of manufacture which is virtually completely restricted to physico-chemical operations such as photo-gravure using relatively simple masks, the deposition of metal by electrolysis, the deposition of resins by dipping or casting, and, possibly, the bonding of thermo-plastic materials.

The method in accordance with the invention comprises the following stages:

- the formation, by selective photogravure in a metal substrate referred to hereinafter as "metal 1" (copper, tin-lead, zinc or nickel), of a first "skeleton" of metal 1, to do duty as a temporary structure for the construction of the wiring which is to be produced using another metal, "metal 2" (gold, silver or copper);
- the deposition, by electrolysis, of metal 2 in strips sufficiently thick to constitute the conductors of the final wiring, and formation of eyelets for establishing through-connections between two conductors located in two adjacent parallel planes, the two conductors intercepting one another at the vertical line constituting the axis of said eyelet;
- the elimination, by photo-gravure, of the metal 1 in accordance with the predetermined pattern;
- the deposition of resin, or bonding of thermoplastic material, in the spaces left by the preceding photogravure operations;
- the repetition of the operations of the preceding stages until the final structure is created;
- the possible development of a resin or thermoplastic base, by casting or bonding.

The invention will be better understood, and other of its features rendered apparent, form a consideration of the ensuing description and the attached drawings, in which:

FIGS. 2 to 17 are transverse sections showing different stages of the manufacture of a wiring arrangement in accordance with the invention;

FIGS. 18 to 21 illustrate a variant embodiment of the invention.

Figure 1:
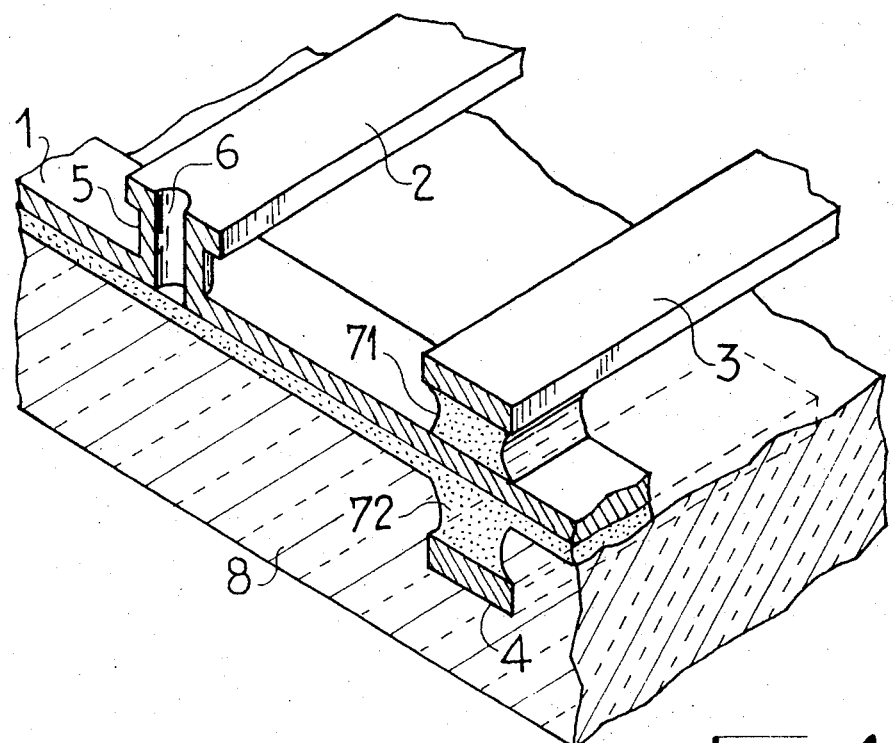
FIG. 1 is an exploded perspective view, illustrating the principle of the invention.
Figure 2:
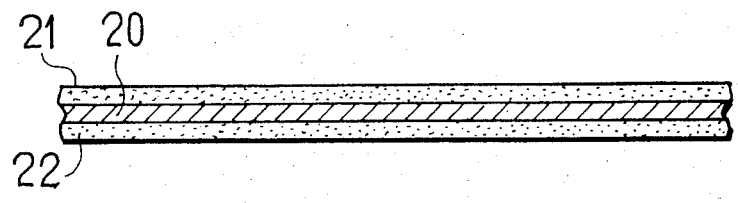

In FIG. 1, part of wiring arrangement comprising three parallel planes has been shown, the conductors of the bottom plane being embedded in a base 8 of polymerised resin. The drawing shows a conductor 1 in the central plane, conductors 2 and 3 in the top plane, and a conductor 4 in the bottom plane.

An eyelet 5 connects the conductors 1 and 2; it comprises a cylindrical hole 6 whose axis is perpendicular to the conductors 1 and 2. Small parallelepiped arrangements 71 and 72 of insulating material, are arranged at the points of interception between the conductors 1 and 3, on the one hand, and 1 and 4 on the other.

In the example described and illustrated (FIGS. 2 to 17), the conductors 1, 2 and 3 and 4 of FIG. 1 can be seen.

Figure 3:
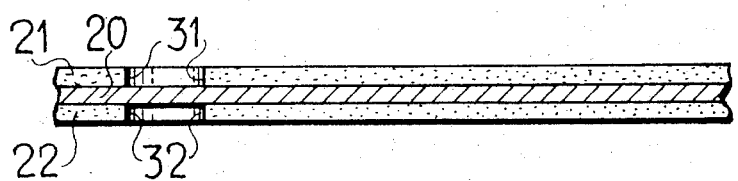
Figure 4:
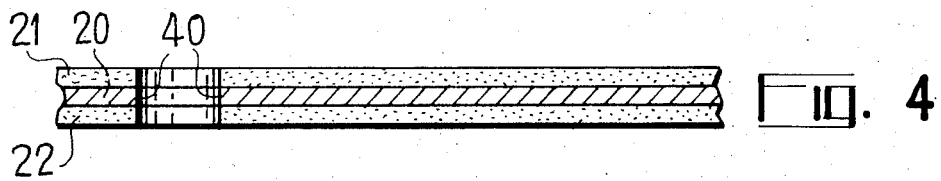
Figure 5:
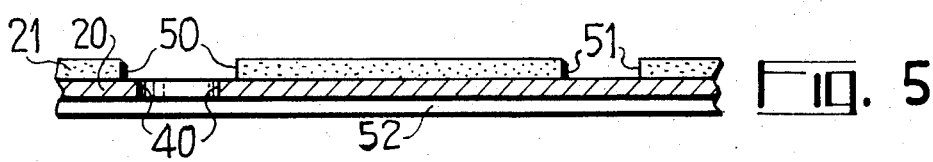
Figure 6:
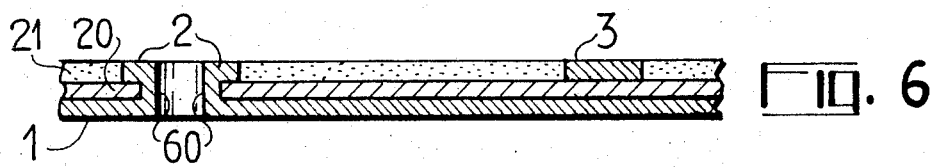
Figure 7:
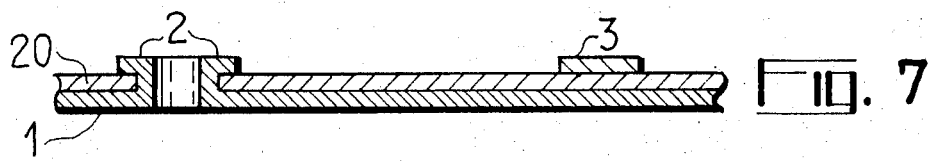
Figure 8:
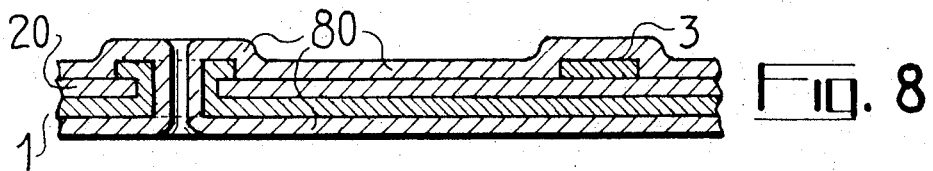
Figure 9:
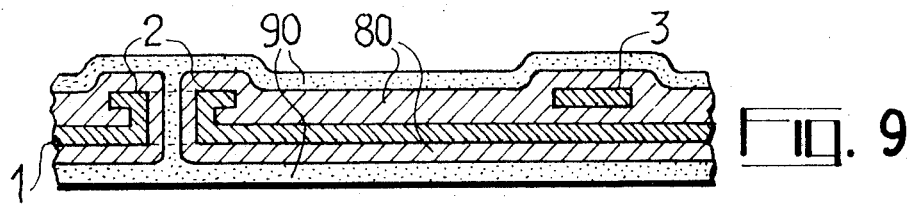
Figure 10:
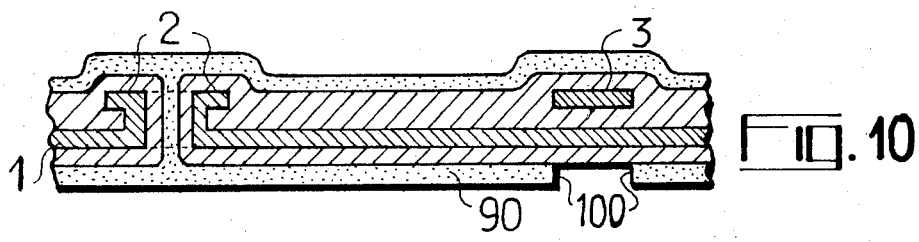
Figure 11:
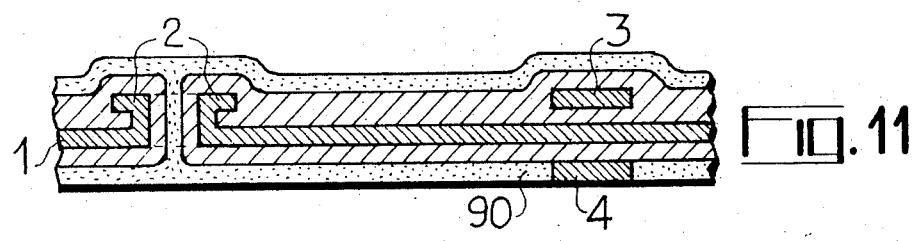
Figure 12:
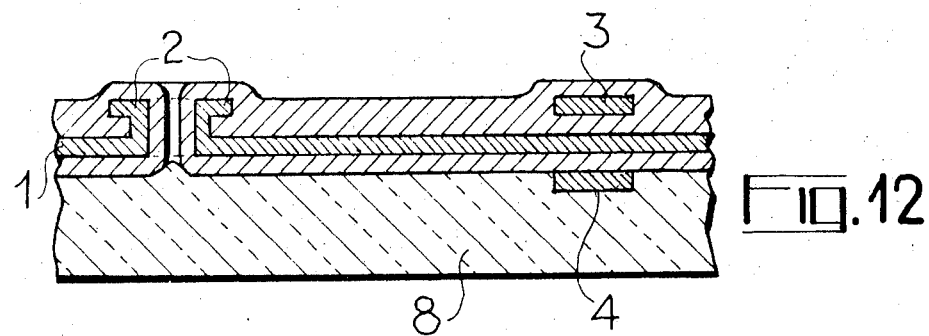
Figure 13:
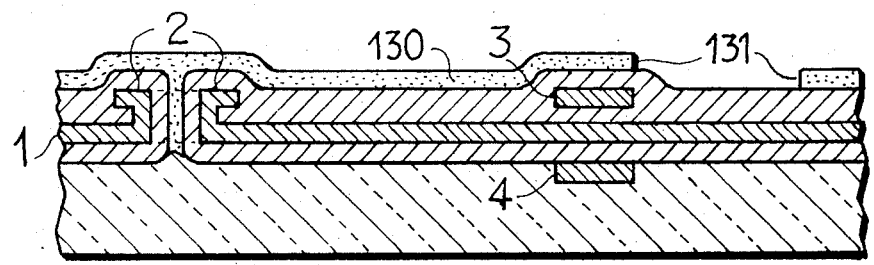
Figure 14:
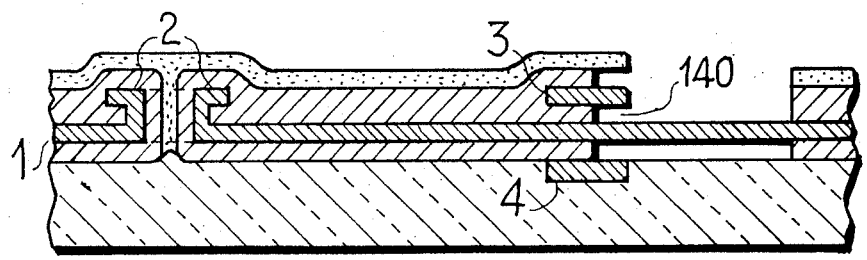
Figure 15:
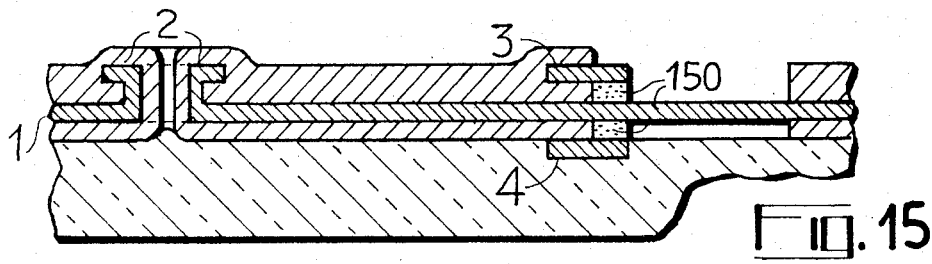

In the case of the example chosen, the stages in the process are as follows:

First stage: the starting point is a sheet of metal 1 (20, FIG. 2) no more than 25 $\mu$ in thickness for example, and two layers of photosensitive resin 21, 22 are deposited, at either side of the sheet 20;

Second stage: using a mask, by a process of exposure and photographic development, two windows 31 and 32 are produced (FIG. 3);

Third stage: using an etching agent such as iron perchloride, a hole 40 (FIG. 4) is formed in the sheet 20;

Fourth stage: with the help of a mask, the photographic process is used to produce openings 50, 51 corresponding to the path of the conductors 2 and 3 being in FIG. 5, and furthermore an opening 52 on the backface corresponding to the path of the future conductor 1;

Fifth stage: by electrolysis, the metal 2 is deposited in the openings formed in the fourth stage, as well as in the hole 40. After this operation, there is generally a hole 60 (FIG. 6) of smaller diameter left. At the end of this stage, the conductors 1, 2 and 3 have been formed but are short-circuited by the sheet 20;

Sixth stage: using a selective etching agent which attacks the remaining resin, the latter is removed (FIG. 7);

Seventh stage: by method of electrolysis, there is produced upon the assembly a depositive metal 1 which constitutes the layers 80 (FIG. 8);

Eighth stage: a resin deposit is produced upon the assembly (FIG. 9);

Ninth stage: using a technique of photography, an opening 100 (FIG. 10) is produced along the path of the future conductor 4;

10th stage: using a method of electrolysis, the conductor 4 (FIG. 11) is deposited;

11th stage: the remaining resin is removed (not illustrated);

12th stage: the assembly is bonded to a base 8 of thermoplastic material (FIG. 12);

13th stage: a resin deposit 130 (FIG. 13) is produced upon the top part of the wiring arrangement;

14th stage: using a photographic technique, an opening 131 (FIG. 13) is produced;

15th stage: with the help of an etching agent which selectively attacks the metal 1 and does not affect the metal 2, an opening 140 (FIG. 14) is produced which penetrates between the conductors 3 and 4 on the one hand and the conductor 1 on the other, to (approximately) halve the width of the strips 3 and 4;

16th stage: photosensitive resin is deposited in the opening 140 (not illustrated);

17th stage: the resin deposited during the course of the 16th stage is exposed and developed as in a photographic technique, leaving behind residues 150 (FIG.

Figure 16:
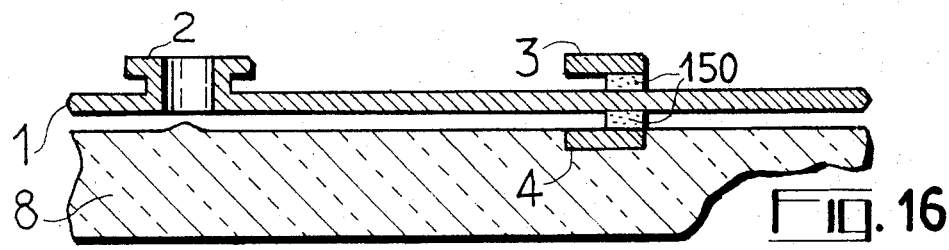

15); designed to provide cohesion in the wiring arrangement in order to be able to carry out the following stages;

18th stage: with the help of the etching agent used in the 15th stage, the residual metal 1 is removed, leaving behind only the four conductors, the resin residues 150 and the base 8 (FIG. 16);

19th stage: a resin layer is deposited upon the assembly;

20th stage: the resin deposited in the 19th stage is exposed, and then developed leaving behind the residues 170 and 171 (FIG. 17).

The above stages have been given purely by way of nonlimitative example. The following are possible variant procedures:

a. deletion of the 12th stage; at the 16th stage, resin is poured to produce simultaneously both the base 8 and the deposit 150, thus making the 17th stage unnecessary;

b. at the 17th stage, a mask can be used to limit the deposition of the resin to the opening 140;

c. a supplementary stage (17b) can be used to produce polymerisation of the resin 150, by baking.

Finally, in the case of a circuit comprising an earthing plane 202 (FIG. 18), it is unnecessary to produce the base 8 referred to in the preceding example. In FIG. 21, there has been illustrated in section a part of a circuit of this type comprising a conductor 222 perpendicular to the plane of the Figure and two conductors 221 and 223 located at either side of the earthing plane 202 with their axes parallel to the plane of the Figure. The resin residues 224 stem from the preceding stages. Amongst these, only those have been shown which correspond:

to FIG. 18 (section) and to FIG. 19 (plan view); using a technique of photogravure, there have been produced upon a sheet 201 of metal 1, struts 203 and 204 of resin, and there has additionally been produced an overall deposit (using electrolysis) of metal 2, constituting the earthing plane 202;

in FIG. 20 (section); after having removed the resin residues 203 and 204, by means of a selective etching procedure the holes 205 and 206 have been produced, and then a layer 210 of metal 1 has been deposited on the assembly by electrolysis.

The invention is applicable not only to wiring arrangements comprising solely conductors of precious metal (gold, silver) but also to ones comprising conductors of copper, this latter being quite a general case.

In other words, selective etching agents are known which will attack a metal 1, which latter may be: a tin-lead alloy, zinc or nickel, without affecting the copper.

The number of layers which can be produced, using the method in accordance with the invention is unlimited and this is yet another advantage of the invention.

What I claim is:

1. A method of manufacturing multilayer electrically conductive circuits composed, of a stack of plane conductors alternately separated by plane insulator layers, through-connections being arranged between the conductors of different layers, the method comprising the following steps of:

a. depositing two layers of photosensitive resin on either side of a substrate of a first metal having two large opposite faces easily attackable by chemical agents;

b. photoengraving windows in said layers at the location of predetermined through-connections, chemically piercing through-holes in said metal at the location of said windows;

c. photo-engraving first openings on one face in the rest of the resin according to the design of first predetermined conductors and parallel to a first direction and second openings on the opposite face according to the design of second predetermined conductors and parallel to a second direction perpendicular to said first direction;

d. depositing by electrolysis a second metal having a high resistance to said chemical agents, said second metal forming said first and second conductors;

e. using successively photographic techniques and chemical action, etching away at least a portion said first metal so as to produce third openings laying bare approximately half the width of each first conductor and fourth openings laying bare the whole width of each second conductor, said third openings extending along the whole length of said first conductors and said fourth openings extending only along a portion of said second conductors;

f. replacing said first metal removed and etched away in step (e) by an insulator and thereafter eliminating by chemical action the remaining first metal;

g. replacing said first metal removed by step (f) by an insulator.

2. A method as claimed in claim 1, wherein said first metal is a tin-lead alloy, zinc, or nickel, said second metal being copper.

3. A method as claimed in claim 1 including the additional step of providing an insulating resin base layer carrying said stack of plane conductors and insulators by depositing a resin on the base of the stack and curing the resin.

4. A method as claimed in claim 1 including the additional step of bonding the resulting stack to a sheet or base of insulating material.

5. A method as claimed in claim 1 wherein the stack produced by step (g) is again processed by repeating steps (a) through (g), inclusive, thereby providing additional conductive layers.

* * * * *